United States Patent
Tabet

[11] 3,762,739
[45] Oct. 2, 1973

[54] HAND TRUCK
[76] Inventor: Michael A. Tabet, 1336 Ballentine Blvd., Norfolk, Va. 23616
[22] Filed: Jan. 13, 1972
[21] Appl. No.: 217,560

[52] U.S. Cl. ............................. 280/47.37, 280/79.1
[51] Int. Cl. .......................................... B62b 11/00
[58] Field of Search ...................... 280/47.37, 47.34, 280/79.1, 79.3, 36 R

[56] References Cited
UNITED STATES PATENTS
1,670,738   5/1928   Odiorne ........................... 280/47.34
1,582,045   4/1926   Howe ........................... 280/47.37 R
3,102,648   9/1963   Hughes ........................... 280/47.34

FOREIGN PATENTS OR APPLICATIONS
956,468   11/1947   France ........................ 280/47.37 R Primary Examiner—Benjamin Hersh
Assistant Examiner—Robert R. Song
Attorney—Clelle W. Upchurch

[57]              ABSTRACT

A lightweight truck is provided with handles which may be secured in an upright operative position at the ends of the truck or may be rapidly and easily stored in an inoperative position by pivoting the handle from its secured position and sliding it along rails provided under the truck's platform.

6 Claims, 5 Drawing Figures

PATENTED OCT 2 1973 3,762,739

HAND TRUCK

This invention relates generally to hand trucks and more particularly to a hand truck which may be converted into one having an upright handle at one or both ends for pushing or pulling it or may be a dolly without an upright handle.

Hand trucks of various kinds are used extensively for moving various articles from place to place. Some of the available trucks have rigidly secured upright handles at both ends for moving and guiding the truck while others may have a handle at only one end. Still others may have a flat platform without upright handles. The truck having two handles is particularly advantageous for moving relatively short but heavy loads. The truck with a handle at only one end may be used for carrying articles which are somewhat longer than its platform but only up to lengths which do not overbalance the weight on the platform. The dolly will accommodate long articles which project beyond each end of the platform. Most establishments which move various types of material require all three types of hand trucks and thus have a relative large investment in such equipment.

It is therefore an object of this invention to provide a hand truck which can be easily converted into any one of the aforesaid kinds of trucks. A further object of the invention is to provide a hand truck with a handle at each end of its platform which may be locked in an upright position to be used for moving the truck or may be stored under the platform to convert it into a dolly without upright handles. A still further object of the invention is to provide a lightweight hand truck or dolly-cart which may be used for transporting articles of various lengths.

Other objects will become apparent from the following description with reference to the accompanying drawing wherein.

The objects of the invention are accomplished in accordance with this invention, generally speaking, by providing a hand truck having an end structure provided with a pocket for storing the lower cross-bar of a handle therein when the handle is in an upright position and disposed at the ends of rails secured along the underside of the platform to provide for the pivoting of the handle to a horizontal position and for sliding it over the rails to store the handle under the truck's platform.

Figure 1:
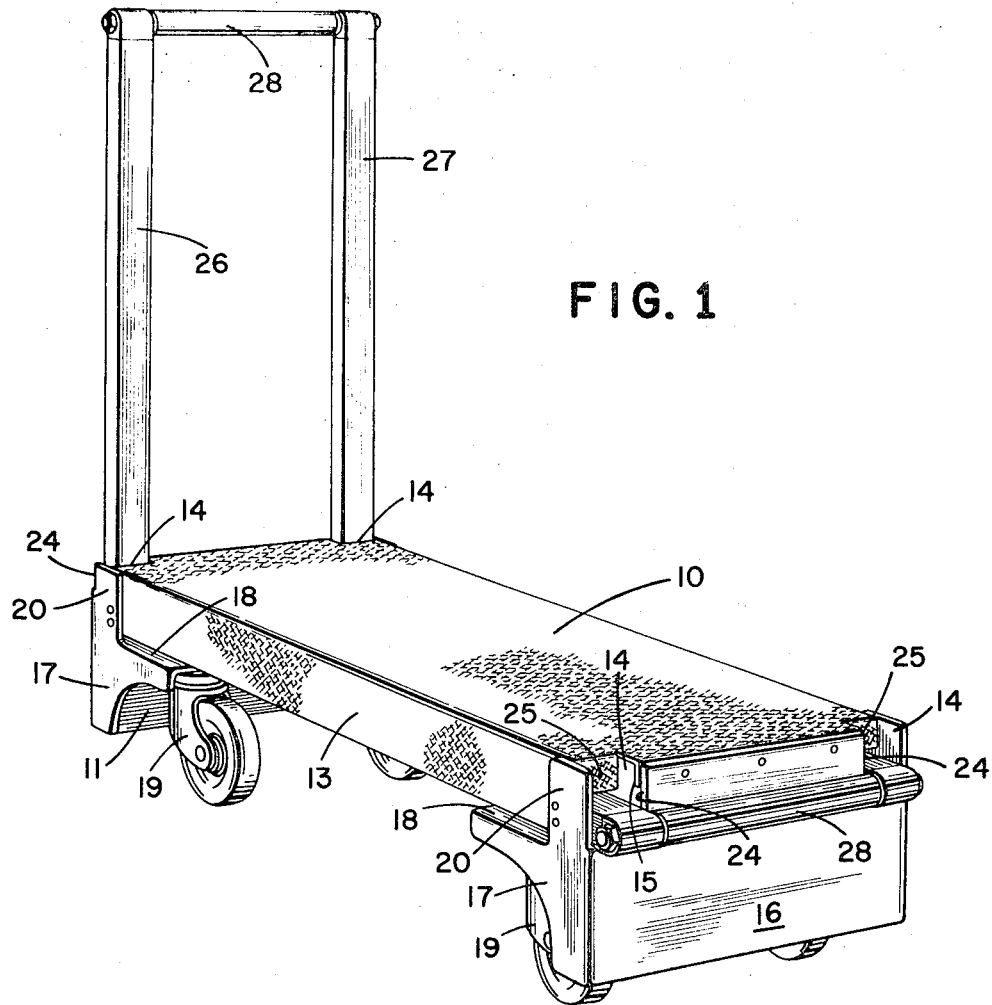
FIG. 1 is a perspective view of one embodiment of the invention.

Referring now to FIG. 1 of the drawing a hand truck is shown having a load receiving platform with a top panel 10 and sidewalls 13. The sidewalls and top panel may be formed from a single sheet of embossed aluminum cut to the proper rectangular size and shape and formed by bending the sheet along a longitudinal line parallel with the edges of the sheet to form integral depending side panels 13. Four rectangular openings or slots may be cut from the sheet before or after the bending operation to form an opening 14 at each corner of top panel 10. Each end of the sheet between openings 14 may also be turned over to form a flange 15 which is riveted or otherwise fixed to a cast aluminum end structure.

Figure 3:
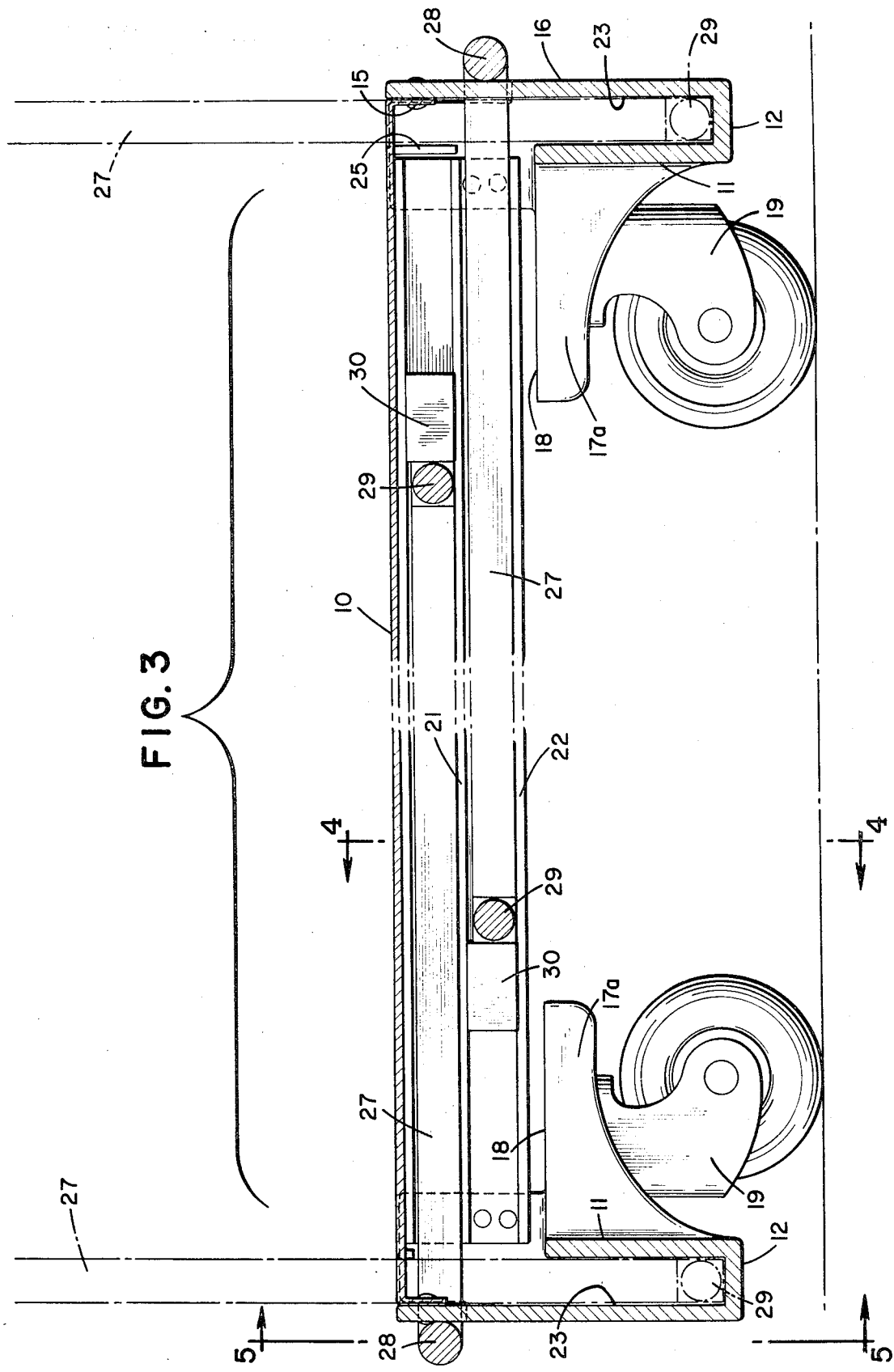
FIG. 3 is a fragmentary longitudinal section of an embodiment of the invention.

Transversely extending external end panels 16 span the width of the truck and are integral with arcuate shaped sidewalls 17 of the end structures. As illustrated in FIG. 3, an internal vertical panel 11 is parallel with panel 16 and in spaced relationship therewith. Panels 11 and 16 are integral with a bottom panel 12. Panels 11, 12 and 16 combine to enclose a U-shaped pocket 23 substantially rectangular in cross-section as shown in FIG. 3.

Figure 4:
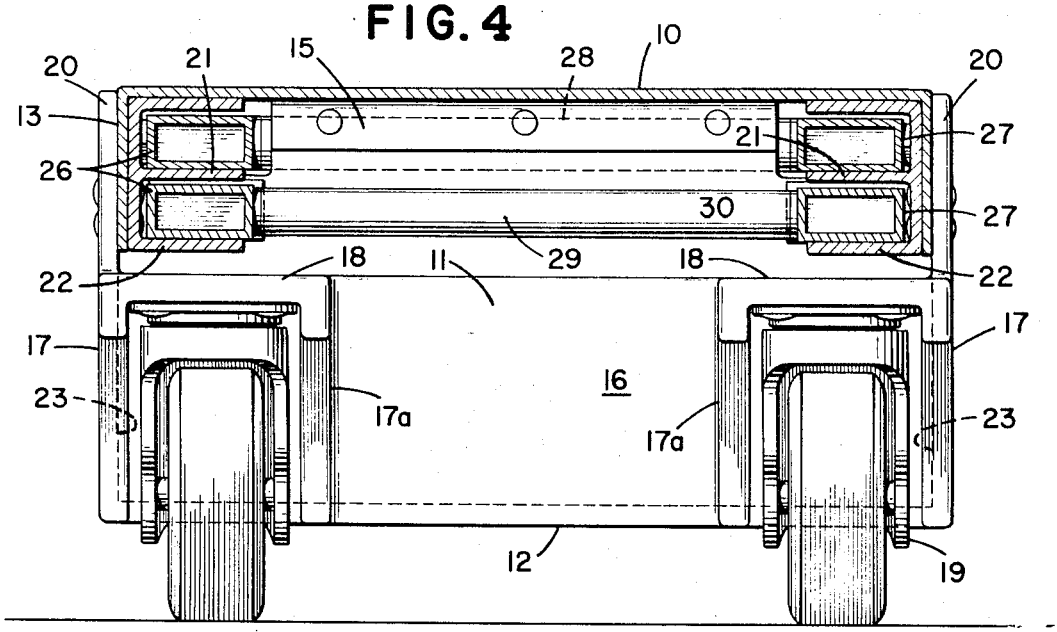
FIG. 4 is a cross-section taken along the line 4—4 of FIG. 3.

Panel 11 terminates at its upper edge below sidewall 13 and has an integral horizontal plate 18 which extends longitudinally and transversely under the corner of the truck's platform as illustrated in FIGS. 3 and 4. A caster 19 is bolted or otherwise secured to shelf-like plate 18. Plate 18 may extend transversely only a short distance under each corner or one plate may extend across the width of panel 16. An internal arcuate shaped member 17A similar to sidewall 17 may be provided as illustrated in FIGS. 3 and 4.

A narrow substantially rectangular plate forms a post 20 which extends above member 18 as a portion of sidewall 17. Sidewalls 13 and post 20 are rigidly secured together with rivets or the like.

Figure 2:
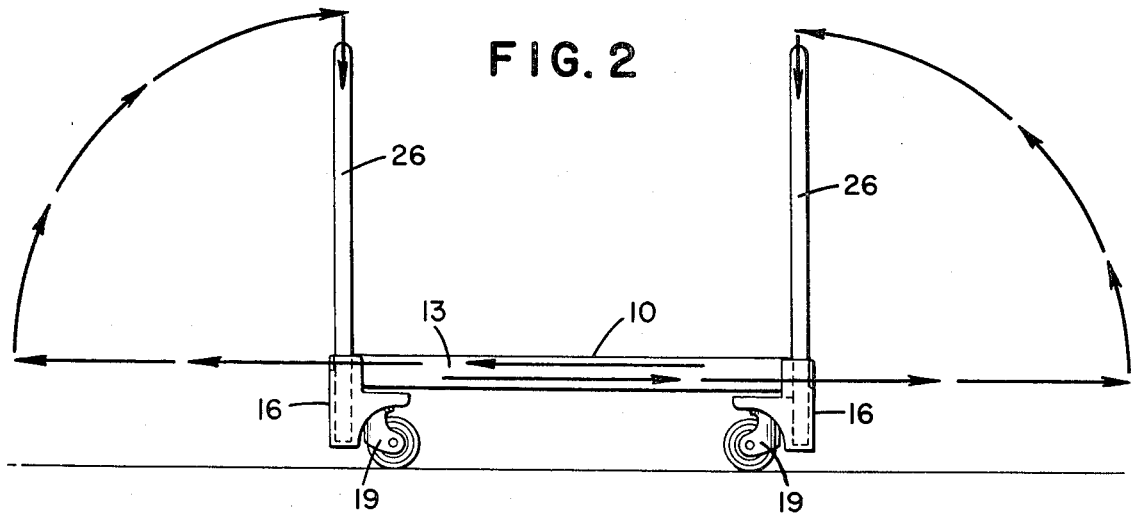
FIG. 2 is a side elevation.

A handle having legs 26 and 27 joined at their ends by upper cross-bar 28 and lower cross-bar 29 is provided at each end of the truck as illustrated in FIGS. 1, 2 and 3.

A pair of diametrically opposite upper guide rails 21 are secured to sidewalls 13 under top panel 10 (FIG. 3). A lower pair of diametrically opposite guide rails 22 are disposed immediately below rails 21 and are secured to sidewalls 13. Rails 21 may be cut from extruded aluminum or steel U-shaped stock and may be installed in the corners formed by top panel 10 and sidewall 13 with their upper surfaces lying flush against the lower surface of top panel 10 to lend support thereto. Rails 22 may be cut from a U-shaped tube stock or may be cut from angle iron or L-shaped aluminum stock. Alternately, the two rails may be fabricated from a single W-shaped extruded aluminum or steel extrusion.

Figure 5:
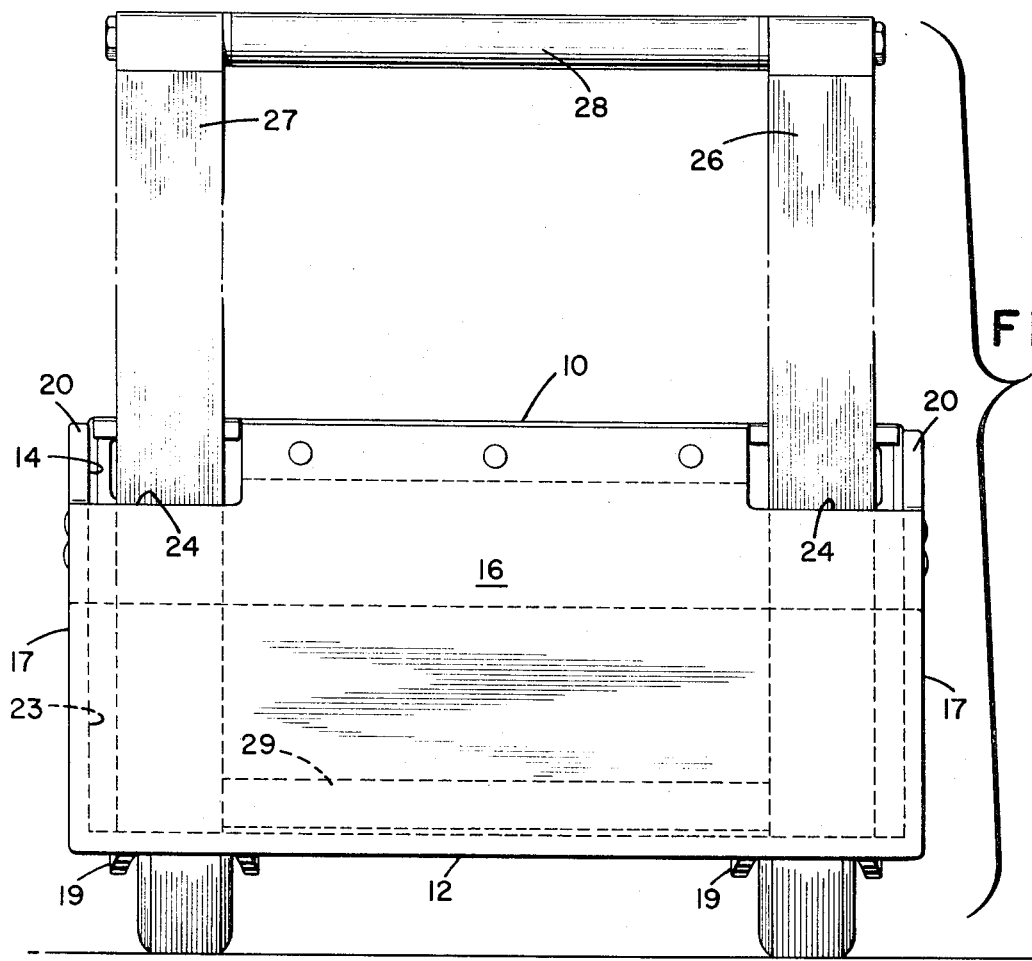
FIG. 5 is an elevation of one end of the truck illustrated in FIG. 1.

The upper rails 21 and lower rails 22 are substantially parallel with top panel 10 and terminate at each end adjacent to the pocket 23. Referring again to FIG. 3, a pocket 23 is disposed below each opening 14. A slot 24 is cut adjacent each upper corner of end panel 16. As indicated in FIG. 1 slots 24 in one end panel 16 terminate opposite the lower rails 22 while in the opposite end of panel 16 the slots 24 terminate opposite upper rails 21 (FIG. 5). Tabs 25 are integral with top panel 10 and close the open ends of the channels above rails 21 adjacent the longer slots 24.

When the handles are in an upright position at the ends of the truck, the lower cross-bar 29 of the handle is disposed in the bottom of pocket 23 and is biased against plate 16 as the truck is pushed or against plate 11 as the truck is pulled by the handle. The legs 26 and 27 extend through openings 14.

The handle adjacent one panel 16 may be stored in the channels above the rails 22 as shown in FIG. 3 by lifting the handle until cross-bar 29 is opposite the open lower ends of the rails below tab 25. The handle is then rotated until it lies in a plane substantially parallel with top panel 10. Slots 24 permit the legs 26 and 27 to rotate. With the handle in a horizontal position, it may be pushed by cross-bar 28 to slide cross-bar 29 and legs 26 and 27 into the channels above rails 22 into the position shown in FIGS. 1 and 3. The handle at the opposite end of the truck may be stored in the channels provided by upper rails 21 by following the same procedure but, as is apparent from FIG. 5, the handle must be raised until cross-bar 29 is opposite the open ends of the channels provided by rails 22.

A magnet 30 may be fixedly secured to each rail 21 and 22 adjacent cross-bars 29 when the handles are stored under the truck's platform to prevent the handles from slipping from their stored position. When the magnet is provided, the lower cross-bar 29 may be fabricated from steel or other magnetic metal or a magnetic metal plug may be inserted in an aluminum rod cut to form the upper cross-bar. The legs 26 and 27 may be rigidly secured to the upper and lower cross-bars 28 and 29 with a suitable nut and bolt or by any other suitable means.

The handles may be returned from the stored position to an operative position by pulling them outwardly from under the truck's platform until cross-bar 29 is above the pocket 23 and rotating the opposite end of the handle in an arc as shown in FIG. 2 until the legs are substantially perpendicular to the platform. The lower end of the handle is then dropped into pocket 23. As suggested by FIG. 3, both handles may be stored under the truck's platform simultaneously to provide a dolly or both may be placed in the upright position shown in FIG. 2. If a load of material somewhat longer than the platform is to be transported, only one handle may be placed in the operative position as illustrated in FIG. 1. Hence, the truck provided by the invention may be rapidly and easily converted into any one of three types of hand trucks.

It is preferred to cut the platform from a single sheet of aluminum to facilitate fabrication of the truck and to provide a lightweight truck but of course other sheet metal may be used if the weight of the truck is insignificant. An embossed or otherwise roughened surface is preferred for the platform.

Although the invention has been described in detail for the purpose of illustration it is to be understood that such detail is solely for that purpose and that those skilled in the art may make changes therein without departing from the spirit and scope of the invention except as it may be limited by the claims.

I claim:

1. A hand truck comprising a load supporting platform having a top panel, end walls and sidewalls below the top panel, a caster mounted below each corner of the top panel, a substantially rectangular handle at each end of the truck and having laterally spaced legs joined at their ends by upper and lower cross-bars, and means for storing the handles under the platform comprising diametrically opposite upper rails and diametrically opposite lower rails secured to the sidewalls and forming upper and lower channels slidably receiving the lower cross-bars as said handle slide into a stored position, said end walls having longitudinally spaced panels forming a pocket therebetween, an opening through the platform at each corner thereof and a slot in each end wall adjacent said openings, each leg of the handle extending through the opening with said lower cross-bar disposed in said pocket and vertically slidable therein, said openings, slots and pockets cooperating to support said handles in an upright position and to permit pivoting thereof into a position wherein the lower cross-bars are disposed at open ends of said channels for sliding of the handle on the rails into said stored position under the platform.

2. The truck of claim 1 wherein the top panel is integral with the side panels and has a rough exposed surface.

3. The truck of claim 2 wherein the said top and side panels are aluminum and the end walls are cast aluminum.

4. The truck of claim 3 wherein the legs and both cross-bars are aluminum, the lower cross-bar contains a magnetic metal at each end thereof and a magnet is disposed adjacent the lower cross-bar when the handle is disposed below the platform.

5. The truck of claim 4 wherein the magnets are rigidly secured to the rails.

6. A hand truck comprising a load supporting platform, a substantially rectangular handle at each end of the truck and having a lower cross-bar, and means for securing said handle in an operative position substantially perpendicular to the truck's platform at each end thereof and for pivoting the said handle and disposing it under the platform in an inoperative position comprising a pair of oppositely disposed upper and lower rails forming upper and lower channels slidably receiving said cross-bar in said inoperative position, and an upwardly opening pocket at each end of the platform for supporting said handle in its upright position and for pivoting the cross-bar into an open end of a pair of said channels.

* * * * *